J. A. BURKS.
FOLDING HAY RAKE.
APPLICATION FILED NOV. 25, 1914.
1,170,605.
Patented Feb. 8, 1916.
2 SHEETS—SHEET 1.
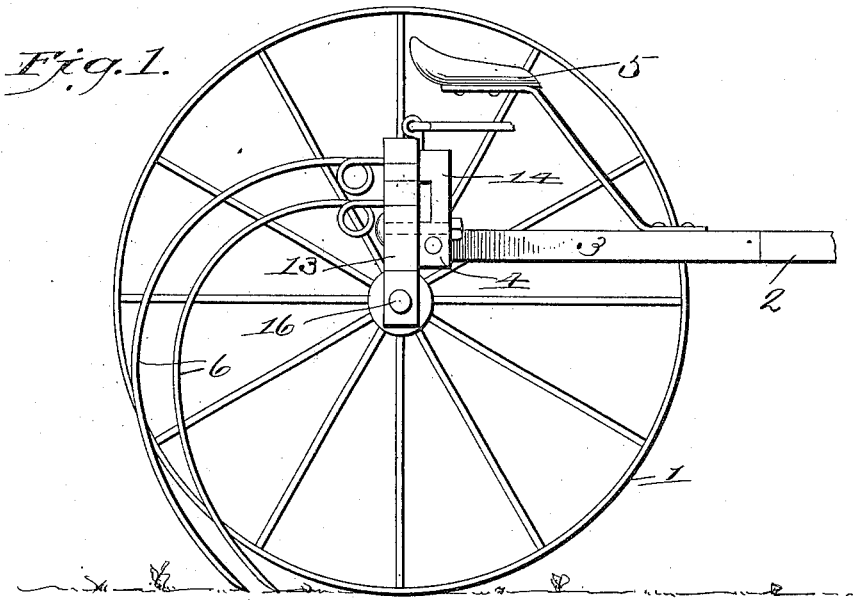
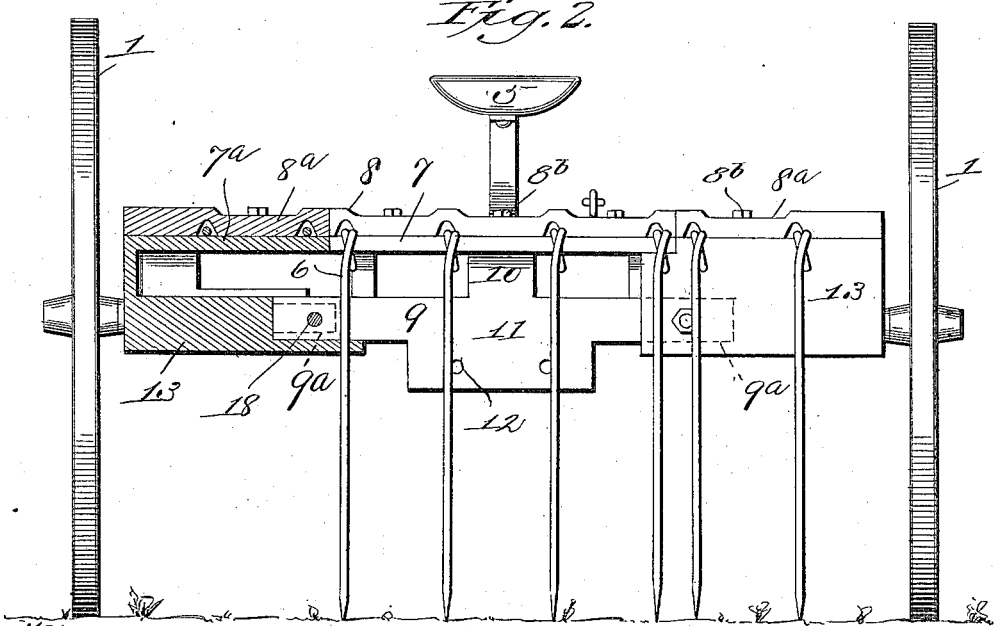

J. A. BURKS.
FOLDING HAY RAKE.
APPLICATION FILED NOV. 25, 1914.

1,170,605.

Patented Feb. 8, 1916.
2 SHEETS—SHEET 2.

Witnesses:

Inventor:
J. A. Burks,
by Chas E Brock
Attorney.

UNITED STATES PATENT OFFICE.

JESSE ALFRED BURKS, OF EZRA, KENTUCKY, ASSIGNOR OF ONE-FIFTH TO A. D. BRITT, OF FREEDOM, KENTUCKY, AND ONE-FIFTH TO W. S. FISHER, ONE-FIFTH TO H. M. JONES, AND ONE-FIFTH TO J. P. JONES, ALL OF EZRA, KENTUCKY.

FOLDING HAY-RAKE.

1,170,605. Specification of Letters Patent. Patented Feb. 8, 1916.

Application filed November 25, 1914. Serial No. 873,988.

*To all whom it may concern:*

Be it known that I, JESSE A. BURKS, a citizen of the United States, residing in Ezra, in the county of Barron and State of Kentucky, have invented a new and useful Improvement in Folding Hay-Rakes, of which the following is a specification.

This invention relates to an adjustable hay rake, the object of the invention being to permit lateral adjustment of the rake, whereby its width can be extended to a length of twelve or more feet or contracted to a length of about six feet. This adjustment not only permits the ready passage of the rake through gates, or along comparatively narrow road ways, but the adjustment is so made that when contracted the prongs all remain in an operative position, being thrown closer together. The rake can therefore be used in contracted position for raking short grasses or can be extended when tall grass is cut or for raking straw or vines.

Figure 3:
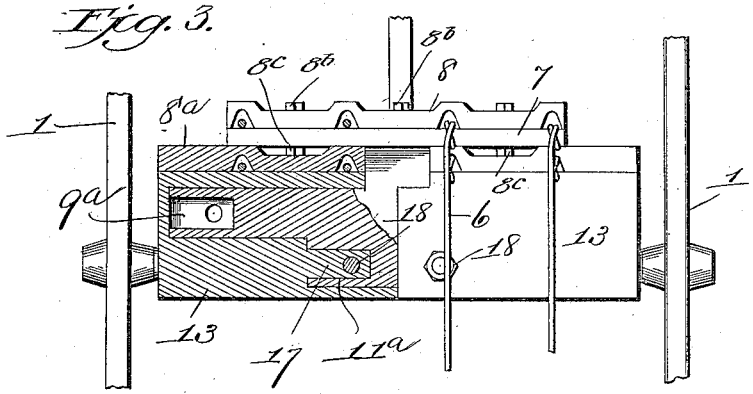
Figure 4:
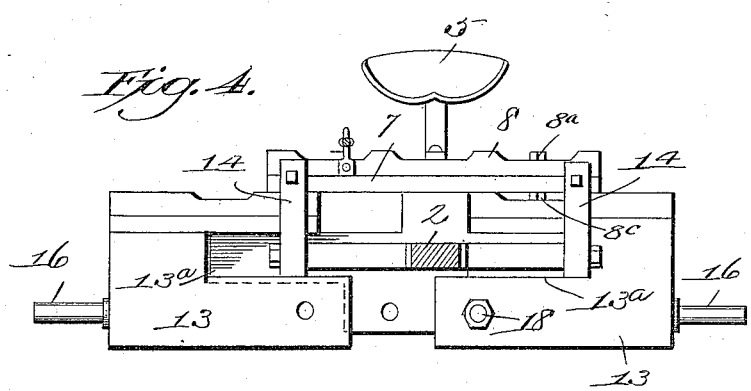
Figure 5:
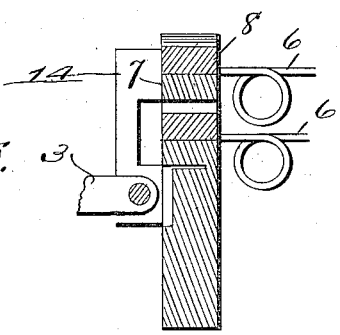

With these various objects in view the invention consists of the novel features of construction hereinafter described, pointed out in the claims and shown in the accompanying drawings, in which:

Figure 1 is a side elevation one wheel being removed and a portion of the tongue being cut off. Fig. 2 is a rear view showing the rake extended, and partly in section. Fig. 3 is a rear view, partly in section showing the rake contracted. Fig. 4 is a front view, the wheels being removed, the rake being contracted and the tongue being in section. Fig. 5 is a vertical section through the rake bar, parts being in contracted position.

In the drawings 1 represents the supporting wheels, 2 the tongue, 3 the supporting braces for the tongue which braces are pivotally connected to suitable brackets 4. 5 indicates the usual seat and 6 the rake prongs. All of these parts are of the usual construction and are found upon rakes now in use. To permit adjustment of the rake I form the parts supporting the prongs and which I will term rake bars, for convenience of description into a middle and end sections. The middle section consists of a suitable plate 7 to which is secured a top plate 8 by screw bolts $8^b$, said top plate being notched upon its under side and the upper ends of the rake prongs are loosely connected within the recesses formed with these notches. Plate 7 is connected to the axle section 9, which section carries midway is ends a suitable upper extension or block 10 upon which the plate 7 rests, the block 10 spacing the axle section 9 from the plate. The central bolt $8^b$ extends through plates 7 and 8 and screws into the block 10, the other bolts are provided with nuts on each end, as at $8^c$. The section 9 is also provided with a downward extension 11, the end portions of which are recessed as shown at $11^a$, of Fig. 3, said extension being provided with suitably threaded openings 12. The end sections are in the form of boxes 13 open at their inner ends and cut out at the front as shown at $13^a$ to receive the lower portions of brackets 14 which are carried by the central section, said brackets being connected respectively to the plates 7 and 8 and the axle section 9, these brackets form means by which the braces 3 may be pivotally connected to the rake. The boxes 13 are closed at their outer ends and these closed end portions carry the spindles 16. The lower portion of the boxes forms a continuation of the axle portion 9, and the ends of said portion being provided with suitable sockets $9^a$ and the boxes 13 carry tongues 17, said tongues being closed by the boxes, and both the sides of the boxes and the tongues are suitably perforated. If desired the perforations of the boxes and tongues and also the openings 12 may be threaded. The tongues 17 when the device is extended as shown in Fig. 2 fit into the sockets $9^a$, and are locked in position by means of suitable locking pins 18, which may either be driven into position, or may be screwed into position provided the openings are threaded. The boxes 13 also carry rake teeth 6 corresponding to those carried by the central portion. When the rake is to be shortened the locking devices 18 are to be withdrawn, and the boxes are fitted to the central section as shown in Figs. 3 and 4, the continuation of the plates 7 and 8 as shown at $7^a$ and $8^a$ slipping into the space between the axle 9 and the plates 7 and 8, the axle portion 9 sliding into the boxes 13 and the tongues 17 sliding into the sockets $11^a$ of the downward extension 11. This brings the rake teeth closer together and decreases the length of the inner rake by one-half. The plate sections $8^a$ have their upper faces suitably recessed or cut away to receive the ends of the bolts and the nuts 8°. As the boxes carry the spindles upon which the wheels 1 are mounted the wheels are of course spaced farther apart when the boxes are fitted upon the ends of the axle section than when said axle section slides into the boxes and the boxes are fitted upon the extension 11.

It will of course be understood that this construction can be applied to various forms of rakes, and quite a number of minor changes can be made in the details of construction without in any way affecting the invention or materially changing the device.

What I claim is:—

1. A folding hay rake comprising a central axle portion, said portion having a central downward extension, the ends of the extension and the ends of the axle portion being both provided with tongue receiving sockets, boxes, spindles carried by said boxes, and tongues arranged within the boxes and adapted to engage either the sockets or the central axle portion or of the extension, the said axle portion sliding into the boxes when the tongues enter the extension sockets.

2. A folding hay rake formed in central and end sections, the central section comprising a plate, rake teeth carried by the plate, an axle section spaced from and below said plate, and a centrally arranged and a downwardly extending extension carried by the axle portion, said axle portion and said extension both having tongue receiving sockets in their ends, boxes having spindles at their outer ends and having interior tongues adjacent their open inner ends, and rake teeth carried by the upper portions of both of said boxes, the said tongues being adapted to enter the sockets of either the central axle portion or the extension, the upper portions of said boxes sliding in the spaces between the axle and the rake carrying plate when the tongues engage the sockets of the extension.

JESSIE ALFRED BURKS.

Witnesses:
 LACY GOSNELL,
 ED. N. SMITH.

Copies of this patent may be obtained for five cents each, by addressing the "Commissioner of Patents, Washington, D. C."